(12) United States Patent
Katayama et al.

(10) Patent No.: US 11,322,026 B2
(45) Date of Patent: May 3, 2022

(54) CONTROL DEVICE AND COMPUTER READABLE STORAGE MEDIUM

(71) Applicant: HONDA MOTOR CO., LTD., Tokyo (JP)

(72) Inventors: Mutsumi Katayama, Saitama (JP); Naohide Aizawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 225 days.

(21) Appl. No.: 16/544,904

(22) Filed: Aug. 20, 2019

(65) Prior Publication Data

US 2020/0066150 A1 Feb. 27, 2020

(30) Foreign Application Priority Data

Aug. 21, 2018 (JP) .............................. JP2018-154826

(51) Int. Cl.
*B60W 50/14* (2020.01)
*G08G 1/0967* (2006.01)
(Continued)

(52) U.S. Cl.
CPC ... *G08G 1/096791* (2013.01); *G06K 9/00791* (2013.01); *G08G 1/012* (2013.01);
(Continued)

(58) Field of Classification Search
USPC ........................................ 340/937; 701/117
See application file for complete search history.

(56) References Cited

U.S. PATENT DOCUMENTS

2012/0147186 A1* 6/2012 Choi ................... G07C 5/0866
348/148
2013/0034016 A1 2/2013 Bai
(Continued)

FOREIGN PATENT DOCUMENTS

CN 102932867 A 2/2013
JP 2006031583 A 2/2006
(Continued)

OTHER PUBLICATIONS

Office Action issued for counterpart Chinese Application 201910724765.2, issued by the China National Intellectual Property Administration dated Jul. 2, 2021.
(Continued)

*Primary Examiner* — Brent Swarthout

(57) ABSTRACT

A control device is provided, including a request-information receiving section that receives request information being for requesting transmission of a captured image of an image-capturing target spot and including spot location information indicating the image-capturing target spot and transmitting source information indicating a transmitting source of the request information; a vehicle location information acquiring section that acquires vehicle location information indicating a location of the first vehicle; and a transmission control section that transmits, to the transmitting source indicated by the transmitting source information, a captured image of the image-capturing target spot captured by an image capturing section included in the first vehicle when the first vehicle is located within a predetermined range with the image-capturing target spot as a reference, and broadcasts the request information to a vehicle other than the first vehicle when the first vehicle is located outside the predetermined range, based on the vehicle location information.

14 Claims, 8 Drawing Sheets

(51) Int. Cl.
  *G06K 9/00* (2022.01)
  *G08G 1/09* (2006.01)
  *H04W 4/40* (2018.01)
  *G08G 1/01* (2006.01)
  *G08G 1/123* (2006.01)
  *G08G 1/04* (2006.01)

(52) U.S. Cl.
  CPC .............. *G08G 1/04* (2013.01); *G08G 1/091* (2013.01); *G08G 1/123* (2013.01); *H04W 4/40* (2018.02)

(56) References Cited

U.S. PATENT DOCUMENTS

| | | | |
|---|---|---|---|
| 2015/0154866 A1 | 6/2015 | Scholl | |
| 2019/0007142 A1* | 1/2019 | Kido | .................. H04N 7/185 |
| 2019/0052915 A1* | 2/2019 | McQuillen | ........... H04N 21/414 |
| 2019/0144001 A1* | 5/2019 | Choi | ..................... B60W 50/14 |
| | | | 701/117 |
| 2019/0225210 A1* | 7/2019 | Herman | .................... G06T 7/55 |
| 2019/0364248 A1* | 11/2019 | Katayama | ................. B60R 1/00 |
| 2020/0034098 A1* | 1/2020 | Katayama | .......... G01C 21/3644 |
| 2020/0359181 A1* | 11/2020 | Kusumoto | ............. H04N 7/185 |

FOREIGN PATENT DOCUMENTS

| | | |
|---|---|---|
| JP | 2013068426 A | 4/2013 |
| JP | 2017117005 A | 6/2017 |

OTHER PUBLICATIONS

Office Action issued for counterpart Japanese Application No. 2018-154826, issued by the Japanese Patent Office dated Nov. 24, 2021 (drafted on Nov. 18, 2021).

* cited by examiner

CONTROL DEVICE AND COMPUTER READABLE STORAGE MEDIUM

The contents of the following Japanese patent application are incorporated herein by reference: 2018-154826 filed in JP on Aug. 21, 2018

BACKGROUND

1. Technical Field

The present invention relates to a control device and a computer readable storage medium.

2. Related Art

An on-vehicle system has been known, which has a unit configured to accept setting of an observation spot from a user, request another on-vehicle system to capture an image of the observation spot, and receive an image of the observation spot from the another on-vehicle system and display the received image (for example, see Patent Document 1).

PRIOR ART LITERATURE

Patent Document

[Patent Document 1] Japanese Patent Application Publication No. 2006-031583

SUMMARY

It is desirable to provide a technology that can properly perform a request for capturing an image of an image-capturing target spot, and communication of a captured image even in an environment in which the communication is performed between vehicles that are in remote places via a plurality of vehicles by direct wireless communication between a vehicle and another vehicle (vehicle-to-vehicle direct communication).

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
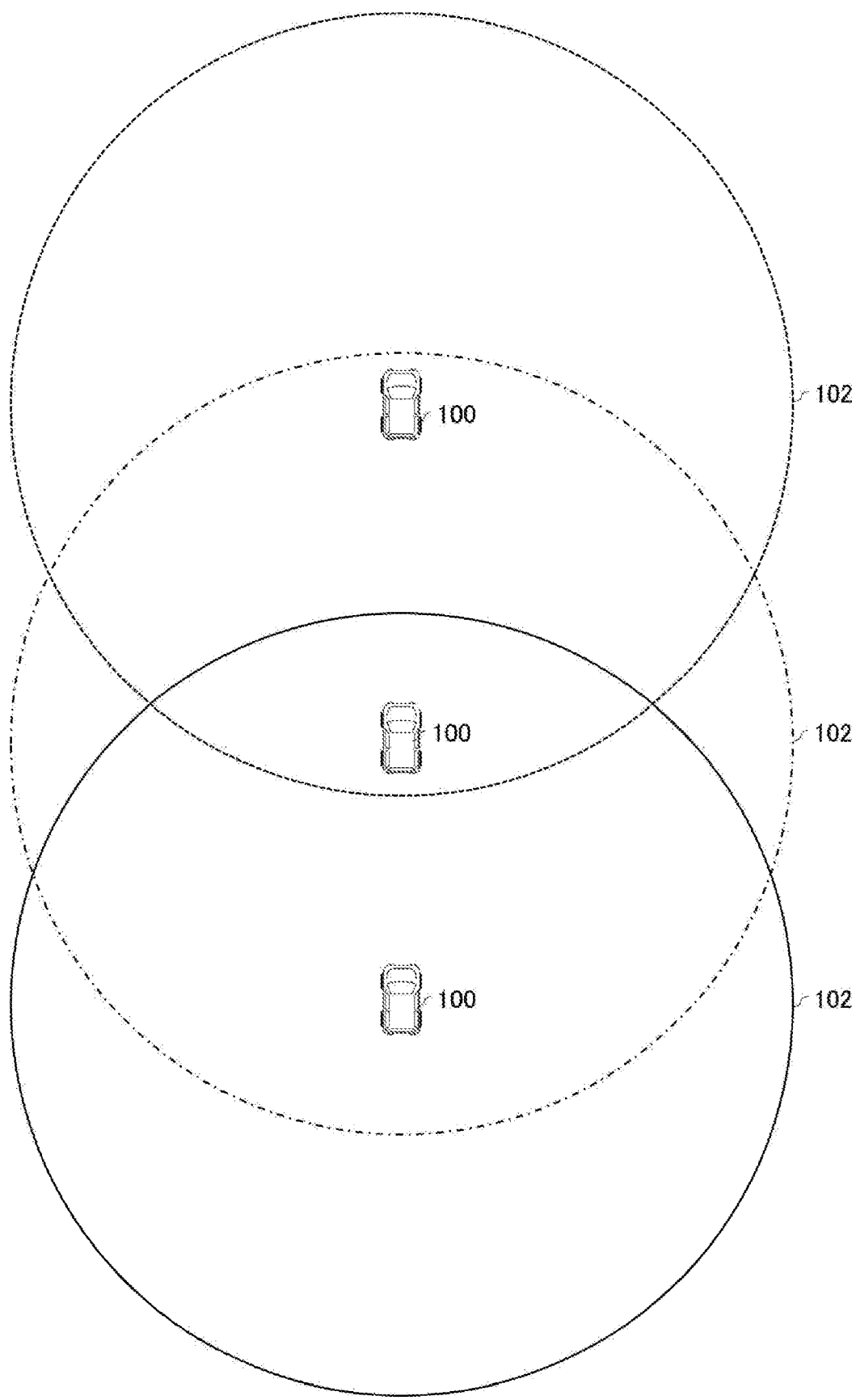
FIG. 1 schematically shows one example of a communication area 102 of a vehicle 100.

FIG. 1 schematically shows one example of a communication area 102 of a vehicle 100 according to the present embodiment. The vehicle 100 performs wireless communication with another vehicle 100 within a communication area 102 by vehicle-to-vehicle direct communication.

The vehicle 100 may perform the vehicle-to-vehicle direct communication by using any well-known vehicle-to-vehicle communication technology. For example, the vehicle 100 performs the vehicle-to-vehicle direct communication by the communication utilizing predetermined frequency bands such as 700 MHz band and 5.8 GHz band, for example. The vehicle 100 may perform wireless communication with still another vehicle 100 via the another vehicle 100. For example, a plurality of vehicles 100 may cooperate with each other by the vehicle-to-vehicle direct communication to form an inter-vehicle network, and vehicles 100 in remote places may also perform communication via the inter-vehicle network.

The vehicle 100 according to the present embodiment includes an image capturing section configured to capture an image of the surrounding of the vehicle 100, where the vehicle 100 transmits a captured image captured by the image capturing section to another vehicle 100, and receives a captured image captured by an image capturing section of the another vehicle 100 from the another vehicle 100. The captured image may be a static image, and may also be a video image (moving image).

For example, the vehicle 100 broadcasts, to another vehicle 100, request information including an image-capturing target spot that is designated by a user of the vehicle 100, and receives a captured image obtained by capturing the image-capturing target spot from another vehicle 100 that can capture an image of the image-capturing target spot. Accordingly, this allows the user of the vehicle 100 to grasp a real-time condition of the image-capturing target spot.

Here, when another vehicle 100 that can capture an image of the image-capturing target spot is present within a communication area 102, the vehicle 100 can receive a captured image from the another vehicle 100; however, when the another vehicle 100 is not present, the vehicle 100 transmits the request information to another vehicle 100 that can capture an image of the image-capturing target spot via a plurality of vehicles 100, for example. The vehicle 100 according to the present embodiment has a function to transfer the request information transmitted by one vehicle 100 to another vehicle 100 that can capture an image of the image-capturing target spot.

Figure 2:
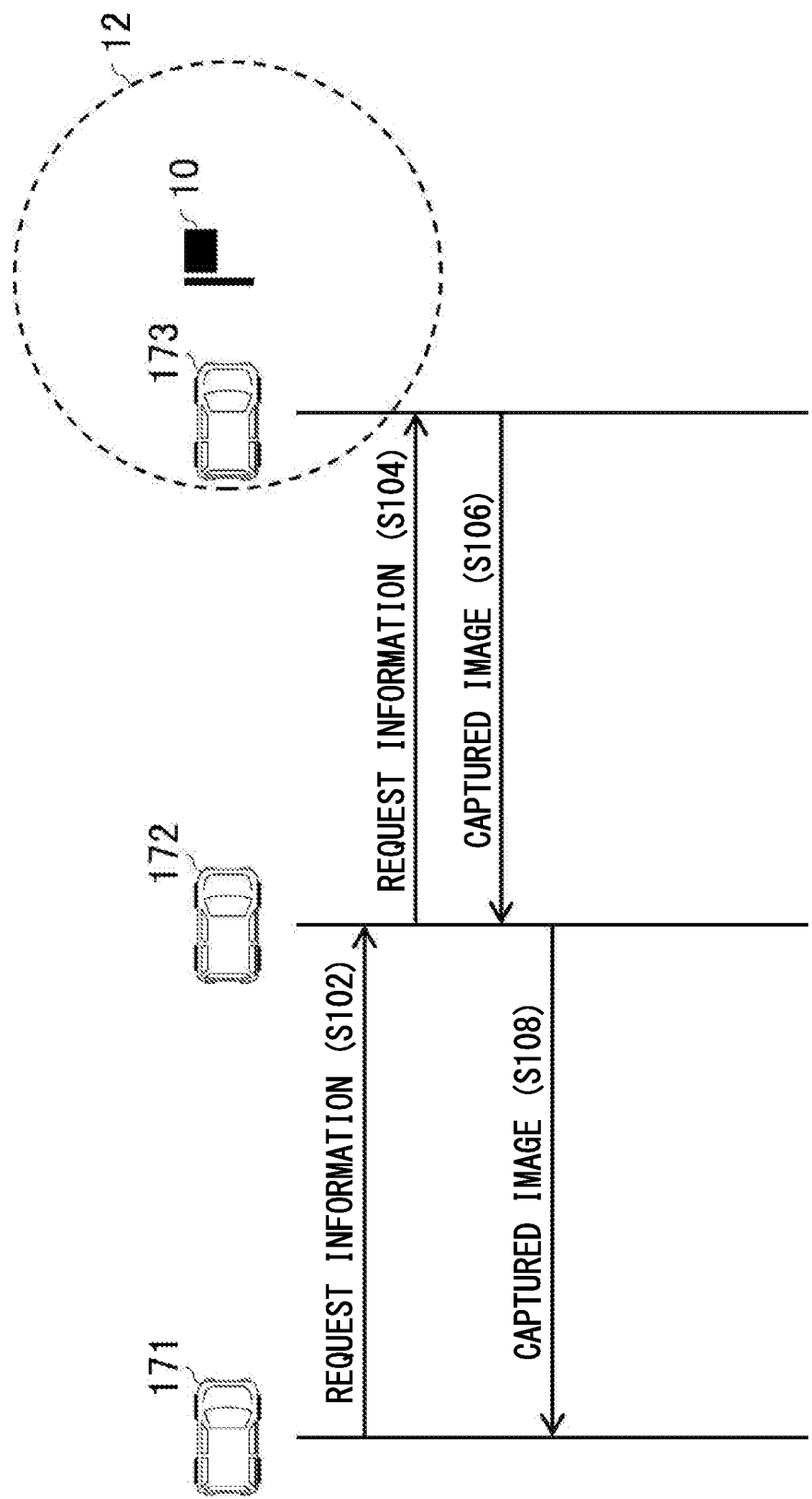
FIG. 2 shows an illustration of a schematic flow of communication by plurality of vehicles 100.

FIG. 2 shows an illustration of a schematic flow of communication by a plurality of vehicles 100. In FIG. 2, a vehicle 171, a vehicle 172 and a vehicle 173 are shown as an example of the plurality of vehicles 100. Here, an example is given for description, in which the vehicle 172 is included within the communication area 102 of the vehicle 171, the vehicle 171 and the vehicle 173 are included within the communication area 102 of the vehicle 172, and the vehicle 172 is included within the communication area 102 of the vehicle 173. An illustration of the communication area 102 is omitted.

In a step 102 (the step may be abbreviated to S), the vehicle 171 broadcasts the request information including spot location information that indicates an image-capturing target spot 10 and transmitting source information indicating a vehicle 171 that is a transmitting source of the request information. The transmitting source information is information by which the vehicle 171 can be identified during the communication. The transmitting source information is, for example, an ID, an IP address and the like allocated to the vehicle 171. Another vehicle can identify the vehicle 171 as a communication party by the transmitting source information. In the example shown in FIG. 2, the vehicle 172 receives the request information.

The vehicle 172 that received the request information determines whether or not the vehicle 172 itself is located within the predetermined range 12 with the image-capturing target spot 10 as a reference. The predetermined range 12 is a range of a predetermined distance from the image-capturing target spot 10, for example. The predetermined distance may be preset for a plurality of vehicles 100. The predetermined distance may also be changeable. Note that the predetermined range 12 is not limited to this, and may also be a range in any shape with the image-capturing target spot 10 as the reference. The shape may be preset for the plurality of vehicles 100. The shape may also be changeable. Also, when an image capturing section of the vehicle 172 constantly captures images of the surrounding, the vehicle 172 that received the request information may also determine whether or not the vehicle 172 itself is located within the predetermined range 12 with the image-capturing target spot 10 as the reference, or determine whether or not the vehicle 172 itself can capture an image of the image-capturing target spot 10 by comparing the captured images to 3D map data.

When the vehicle 172 determines that the vehicle 172 is located within the predetermined range 12, the vehicle 172 may determine that the vehicle 172 itself to capture an image of the image-capturing target spot 10 and transmit the captured image to the vehicle 171 that is the transmitting source of the request information, and when the vehicle 172 determines that the vehicle 172 is located outside the predetermined range 12, the vehicle 172 may broadcast the request information. In the example shown in FIG. 2, because the vehicle 172 is located outside the predetermined range 12, the vehicle 172 broadcasts the request information (S104).

The vehicle 172 may include, in the request information, the transmitting source information that indicates the vehicle 172 being the transmitting source of the request information. The transmitting source information is information by which the vehicle 172 can be identified during the communication. The transmitting source information is an ID, an IP address and the like allocated to the vehicle 172, for example. Another vehicle can identify the vehicle 172 as the communication party according to the transmitting source information. Note that in the present embodiment, in order to distinguish that generating and transmitting the request information according to an instruction and the like of the user from that receiving the request information from another vehicle and transmitting the request information to still another vehicle, the former may be described as that transmitting the request information. The vehicle 172 may further include, in the request information, vehicle location information that indicates a location of the vehicle 172 itself.

In the example shown in FIG. 2, the vehicle 173 receives the request information. Although the vehicle 171 also receives the request information, the vehicle 171 may refer to the transmitting source information included in the request information, and recognize that the request information is the request information transmitted by the vehicle 171 itself and discard the request information.

The vehicle 173 determines whether or not the vehicle 173 itself is located within the predetermined range 12 with the image-capturing target spot 10 as the reference. In the example shown in FIG. 2, because the vehicle 173 is located within the predetermined range 12, the vehicle 173 determines that the vehicle 173 itself captures an image of the image-capturing target spot 10 and transmits the captured image to the vehicle 171 that is the transmitting source.

When an image capturing section of the vehicle 173 constantly captures images of the surrounding of the vehicle 173, the vehicle 173 may acquire, from among the captured images, a captured image of the image-capturing target spot as a captured image of a transmitting target. When the image capturing section of the vehicle 173 does not constantly capture images of the surrounding, at the time point when the vehicle 173 reaches a location at which an image of the image-capturing target spot can be captured, the vehicle 173 acquires captured images of the transmitting target by causing the image capturing section to start to capture images.

The vehicle 173 transmits the captured images to the vehicle 171 being the transmitting source of the request information. To transmit the captured images to the vehicle 171, the vehicle 173 refers to the transmitting source information included in the request information received in S104 and transmits the captured image to the vehicle 172 (S106).

Here, the vehicle 173 may broadcast the transmitting source information included in the request information received in S104 along with the captured images. The vehicle 172 receives the captured image, and stores the captured image under a condition that the transmitting source information transmitted along with the captured image indicates that the vehicle 172 itself is the transmitting source. Also, for example, the vehicle 173 may also establish connection with the vehicle 172 for transmitting captured images, and transmit the captured images to the vehicle 172 via the connection.

The vehicle 172 may transmit a captured image received in S106 to the vehicle 171 indicated by the transmitting source information (S108). The vehicle 172 may broadcast the transmitting source information along with the captured image, for example. Also, the vehicle 172 may establish connection with the vehicle 171 for transmitting captured images, and transmit the captured images to the vehicle 171 via the connection. According to the above flow, a request for image capturing by the vehicle 171 and reception of captured images are achieved.

Figure 3:
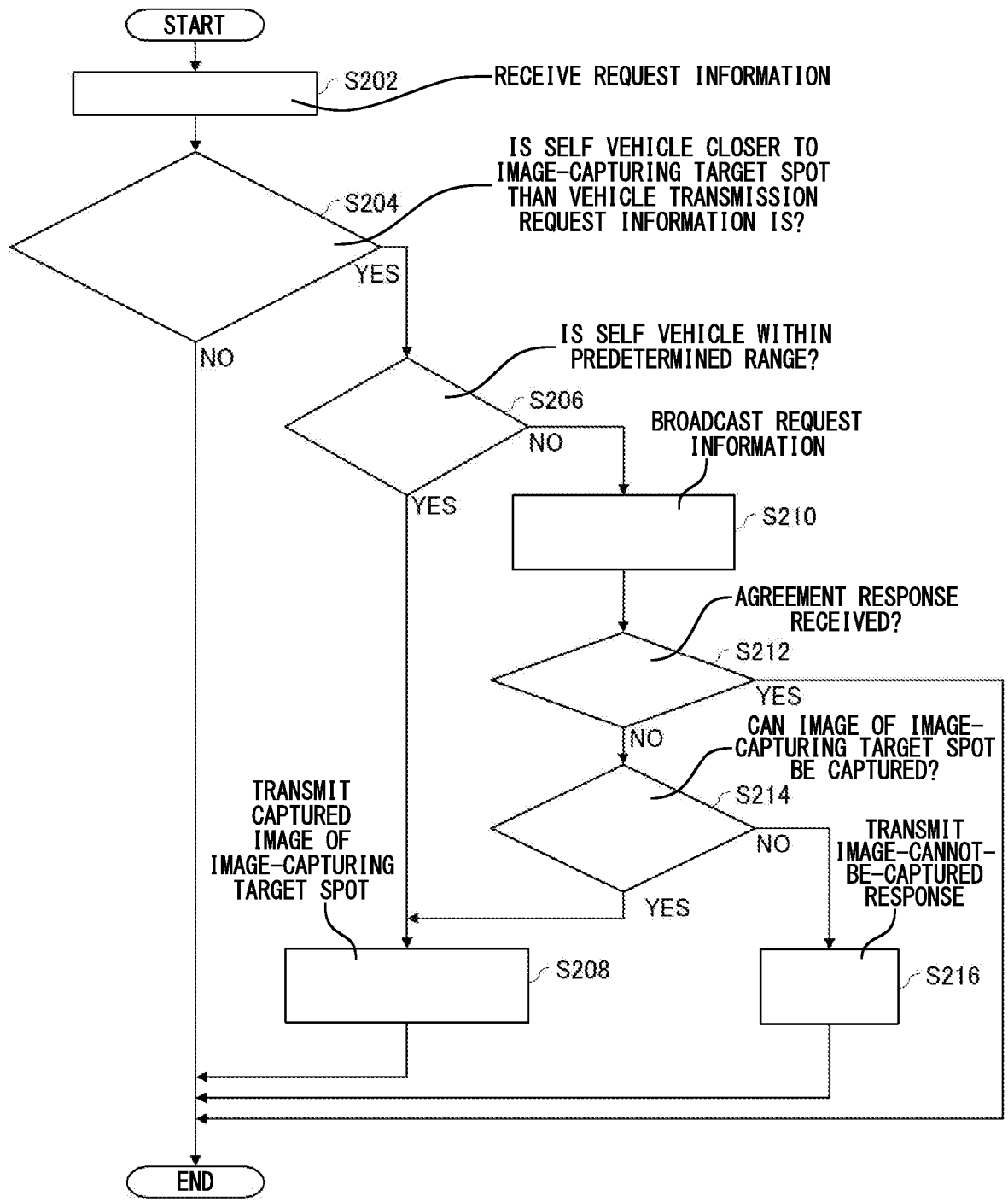
FIG. 3 schematically shows one example of a process flow by the vehicles 100.

FIG. 3 schematically shows one example a process flow by the vehicle 100. FIG. 3 shows a process when a vehicle 100 has received the request information from another vehicle 100. The process shown in FIG. 3 may be performed by a control device, as a subject, included in the vehicle 100.

In S202, the request information is received. When receiving a plurality of pieces of request information from a plurality of vehicles 100 other than the vehicle 100, if the spot location information and the transmitting source information included in the received request information are the same, the vehicle 100 may discard other pieces of request information among the plurality of pieces of request information other than one piece of request information.

In S204, it is determined whether or not the vehicle 100 itself is closer to the image-capturing target spot than another vehicle 100 transmitting the request information. Whether or not the vehicle 100 is closer to the image-capturing target spot may be determined by comparing a distance of a path from the another vehicle 100 to the image-capturing target spot to a distance of a path from the vehicle 100 itself to the image-capturing target spot. Also, whether or not the vehicle 100 is closer to the image-capturing target spot may also be determined by comparing a linear distance between the another vehicle 100 and the image-capturing target spot to a linear distance between the vehicle 100 itself and the image-capturing target spot. If it is determined that it is closer, the process proceeds to S206, and if it is determined that it is not closer, the request information received in S202 is discarded and the process ends.

In S206, it is determined whether or not the vehicle 100 itself is located within the predetermined range 12 with the image-capturing target spot indicated by the spot location information included in the request information as the reference. If it is determined that the vehicle 100 itself is located within the predetermined range 12, the process proceeds to S208, and if it is determined that the vehicle 100 itself is located outside the predetermined range, the process proceeds to S210.

In S208, the captured image of the image-capturing target spot is transmitted to a vehicle 100 indicated by the transmitting source information included in the request information. When the transmitting source information and the transmitting source information are included in the request information, the vehicle 100 may transmit the captured image to a vehicle 100 indicated by the transmitting source information. When the transmitting source information is not included in the request information, the vehicle 100 may transmit the captured image to the vehicle 100 indicated by the transmitting source information.

When the image capturing section of the vehicle 100 constantly captures images of the surrounding thereof, the vehicle 100 may transmit captured images obtained by capturing the images of the image-capturing target spot among the captured images. When the image capturing section of the vehicle 100 does not constantly capture images of the surrounding, the vehicle 100 may cause the image capturing section to start to capture images at the time point when the vehicle 100 reaches a location at which the image capturing section can capture an image of the image-capturing target spot, and transmit the captured images.

In S210, the request information is broadcasted. The vehicle 100 may add, to the request information, transmitting source information that indicates the vehicle 100 itself (self vehicle) and vehicle location information that indicates a location of the self vehicle, and then broadcast the request information. In S212, the vehicle 100 determines whether an agreement response to the request information broadcasted in S210 has been received before predetermined time since the request information is broadcasted elapses. When the agreement response is not received and the predetermined time elapses, the process proceeds to S214, and when the agreement response is received within the predetermined time, the process ends.

In S214, the vehicle 100 determines whether or not an image of the image-capturing target spot can be captured. For example, the vehicle 100 refers to route information of the vehicle 100 itself, when the image-capturing target spot 10 is included within the route, determines that an image of the image-capturing target spot 10 can be captured, and when the image-capturing target spot 10 is not included in the route, determines that an image of the image-capturing target spot 10 cannot be captured. When it is determined that an image of the image-capturing target spot can be captured, the vehicle 100 transmits the agreement response to another vehicle 100 that transmitted the request information received in S202, and the process proceeds to S208. When it is determined that an image of the image-capturing target spot cannot be captured, the process proceeds to S216. When it is determined that an image of the image-capturing target spot cannot be captured, the vehicle 100 transmits an image-cannot-be-captured response to the another vehicle 100 that transmitted the request information received in S202.

Figure 4:
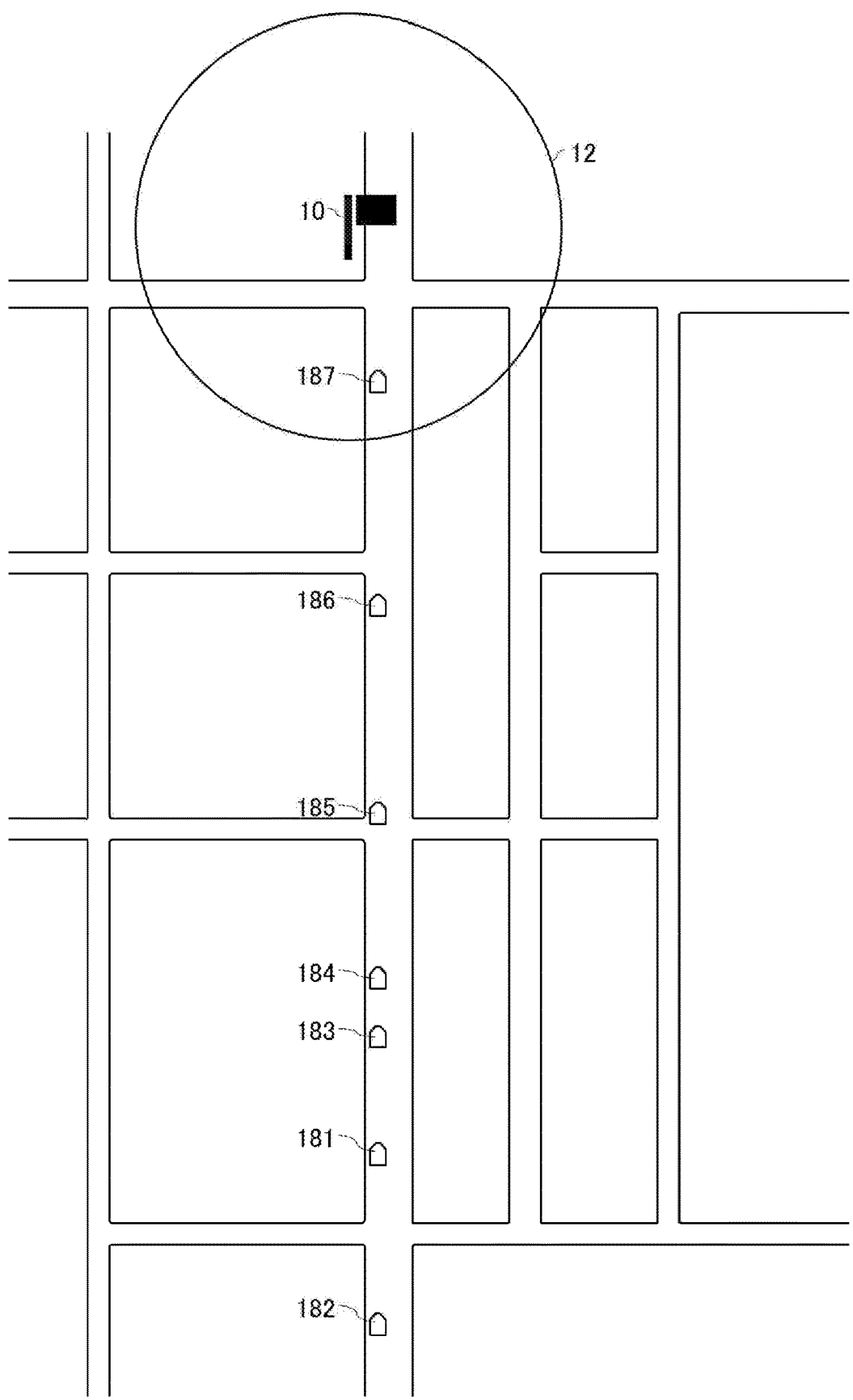
FIG. 4 schematically shows one example of a process flow by the vehicles 100.

FIG. 4 shows an illustration of a communication flow by a plurality of vehicles 100. In FIG. 4, a vehicle 181, a vehicle 182, a vehicle 183, a vehicle 184, a vehicle 185 a vehicle 186 and a vehicle 187 are shown, as an example of the plurality of vehicles 100. Although the communication area 102 is omitted in the drawing, it is described that the vehicle 182, the vehicle 183 and the vehicle 184 are included in the communication area 102 of the vehicle 181, the vehicle 181 is included in the communication area 102 of the vehicle 182, the vehicle 181, the vehicle 184, and the vehicle 185 are included in the communication area 102 of the vehicle 183, the vehicle 181, the vehicle 183, and the vehicle 185 are included in the communication area 102 of the vehicle 184, the vehicle 183, the vehicle 184, and the vehicle 186 are included in the communication area 102 of the vehicle 185, and the vehicle 185 and the vehicle 187 are included in the communication area 102 of the vehicle 186. Also, here, a case is described, where the vehicle 181 broadcasts the request information including vehicle location information that indicates a location of the vehicle 181, spot location information that indicates the image-capturing target spot 10, and transmitting source information that indicates the vehicle 181.

The request information broadcasted by the vehicle 181 reaches the vehicle 182, the vehicle 183 and the vehicle 184. Because the vehicle 182 is not closer to the image-capturing target spot 10 than the vehicle 181 is, the vehicle 182 discards the received request information.

Because the vehicle 183 is closer to the image-capturing target spot 10 than the vehicle 181 is and the vehicle 183 itself is not located within the predetermined range 12, the vehicle 183 broadcasts the request information. Similarly, the vehicle 184 also broadcasts the request information.

Although the vehicle 183 receives the request information transmitted by the vehicle 184, the vehicle 183 discards the request information because the already-received request information is the same as the spot location information and the transmitting source information. Although the vehicle 184 also receives the request information transmitted by the vehicle 183, the vehicle 184 discards the request information because the already-received request information is the same as the spot location information and the transmitting source information. Although the vehicle 181 receives the request information transmitted by the vehicle 183 and the request information transmitted by the vehicle 184, the vehicle 181 discards these pieces of request information because the transmitting source is the vehicle 181 itself.

The vehicle 185 receives the request information transmitted by the vehicle 183 and the request information transmitted by the vehicle 184. Because the spot location information and the transmitting source information of the request information received from the vehicle 183 are the same as the spot location information and the transmitting source information of the request information received from the vehicle 184, the vehicle 185 discards any of them. Because the vehicle 185 itself is not located within the predetermined range 12, the vehicle 185 broadcasts the request information.

The request information reaches the vehicle 186, and the vehicle 183 and the vehicle 184. The vehicle 183 and the vehicle 184 discard the received request information. Because the vehicle 186 itself is not located within the predetermined range 12, the vehicle 186 broadcasts the request information. The request information reaches the vehicle 185 and the vehicle 187. The vehicle 185 discards the request information.

Because the vehicle 187 itself is located within the predetermined range 12, the vehicle 187 determines that the vehicle 187 itself captures an image of the image-capturing target spot 10 and transmits the captured image to the vehicle 181. The vehicle 187 refers to the transmitting source information included in the request information, and transmits an agreement response to the vehicle 181. The agreement response may be transmitted to the vehicle 181 via the vehicle 186, the vehicle 185, the vehicle 184 or the vehicle 183.

The vehicle 187 captures an image of the image-capturing target spot 10 and transmits the captured image to the vehicle 181. The captured image may be transmitted to the vehicle 181 via the vehicle 186, the vehicle 185, the vehicle 184 or the vehicle 183.

Here, a case where the vehicle 187 is not present is described. Because the vehicle 186 itself that has received the request information transmitted by the vehicle 185 is not located within the predetermined range 12, the vehicle 186 broadcasts the request information. In this case, because there is no vehicle 100 that receives the request information and transmits the agreement response, the vehicle 186 does not receive the agreement response until the predetermined time elapses.

Here, the vehicle 186 determines whether or not the vehicle 186 itself can capture an image of the image-capturing target spot 10 or not. In the example shown in FIG. 4, because the vehicle 186 can capture an image of the image-capturing target spot 10, the vehicle 186 transmits the agreement response to the vehicle 185. Then, after the vehicle 186 moves to a location at which the vehicle 186 can capture an image of the image-capturing target spot 10, the vehicle 186 captures an image of the image-capturing target spot 10 and transmits the captured image to the vehicle 181.

Figure 5:
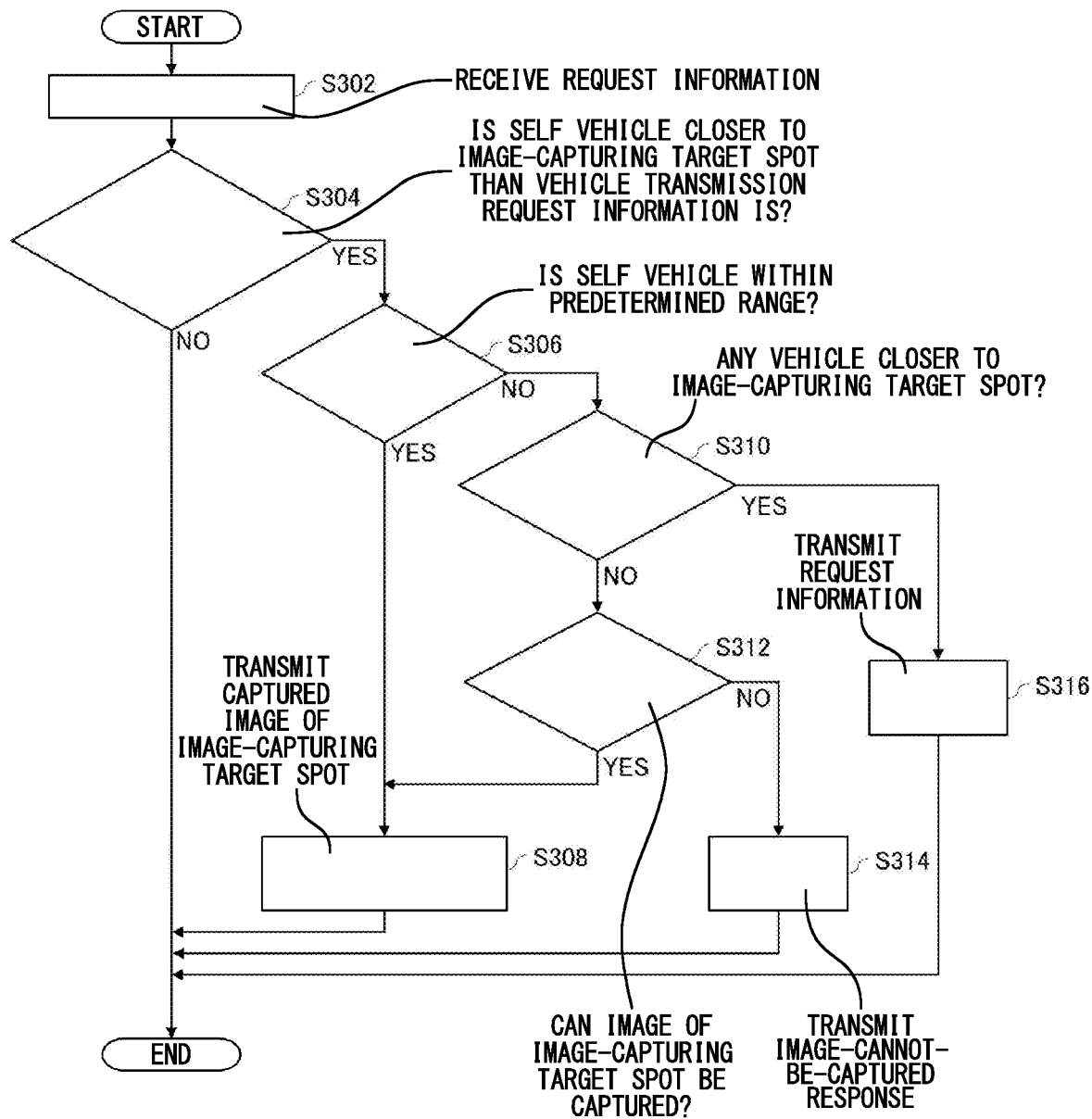
FIG. 5 shows an illustration of a flow of communication by the plurality of vehicles 100.

FIG. 5 schematically shows one example of a process flow by the vehicle 100. FIG. 5 shows another process when the vehicle 100 has received the request information from another vehicle 100. Here, different points from FIG. 3 are mainly described.

In S302, the request information is received. In S304, it is determined whether or not the vehicle 100 itself is closer to the image-capturing target spot than the another vehicle 100 being the transmitting source of the request information is. When it is determined that the vehicle 100 itself is closer to the image-capturing target spot, the process proceeds to S306, and when it is determined that the vehicle 100 itself is not closer to the image-capturing target spot, the request information received in S302 is discarded and the process ends.

In S306, it is determined whether or not the vehicle 100 itself is located within the predetermined range 12 with the image-capturing target spot indicated by the spot location information included in the request information as a reference. When it is determined that the vehicle 100 itself is located within the predetermined range 12, the process proceeds to S308, and when it is determined that vehicle 100 itself is located outside the predetermined range 12, the process proceeds to S310. In S308, the captured image of the image-capturing target spot is transmitted to the vehicle 100 indicated by the transmitting source information included in the request information.

In S310, it is determined whether or not there is a vehicle that is closer to the image-capturing target spot than the vehicle 100 itself is. For example, the vehicle 100 requests vehicle location information to another vehicle 100 within the communication area 102 and refers to the vehicle location information received from the another vehicle 100 within the communication area 102 so as to determine whether or not there is a vehicle that is closer to the image-capturing target spot than the vehicle 100 itself is. When it is determined that there is no vehicle that is closer to the image-capturing target spot than the vehicle 100 itself is, the process proceeds to S312, and when it is determined that there is a vehicle that is closer to the image-capturing target spot than the vehicle 100 itself is, the process proceeds to S316.

In S312, it is determined whether or not the vehicle 100 can capture an image of the image-capturing target spot. When it is determined that the vehicle 100 can capture an image of the image-capturing target spot, the vehicle 100 transmits the agreement response to the another vehicle 100 that transmitted the request information received in S302, and the process proceeds to S308. When it is determined that the vehicle 100 cannot capture an image of the image-capturing target spot, the process proceeds to S314. In S314, the vehicle 100 itself transmits an image-cannot-be-captured response to the another vehicle 100 that transmitted the request information received in S302. In S316, the request information is broadcasted. Then, the process ends.

Figure 6:
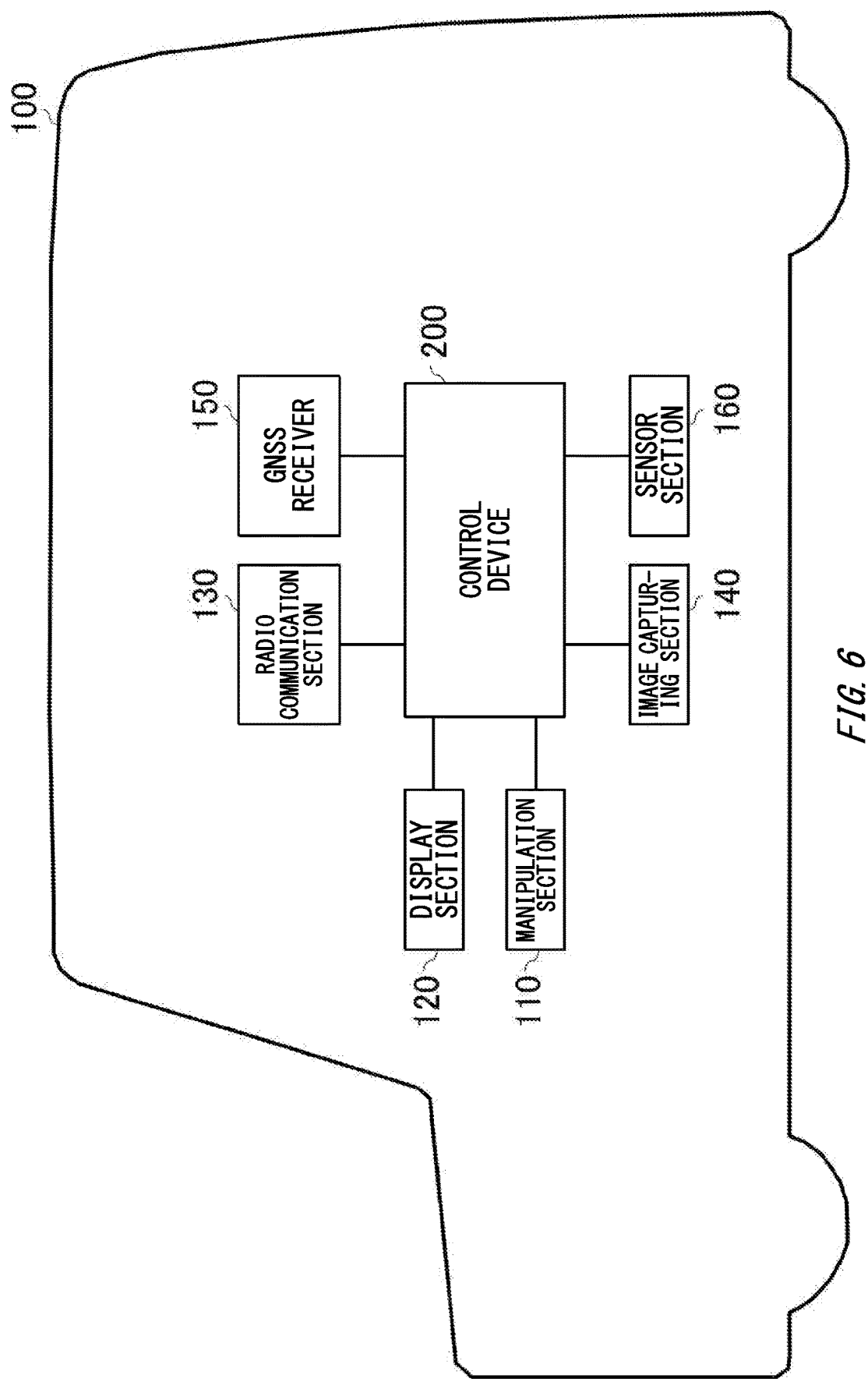
FIG. 6 schematically shows one example of a configuration of the vehicle 100.

FIG. 6 schematically shows one example of a configuration of the vehicle 100. The vehicle 100 includes a manipulation section 110, a display section 120, a wireless communication section 130, an image capturing section 140, GNSS (Global Navigation Satellite System) receiving section 150, a sensor section 160 and a control device 200. At least some of these components may be a component included in a so-called car navigation system.

The manipulation section 110 accepts manipulation by a user of the vehicle 100 (which may be described as a self vehicle) on which a control device 200 is mounted. The manipulation section 110 may include physical manipulation buttons. The manipulation section 110 and the display section 120 may also be a touch panel display. The manipulation section 110 may also accept audio manipulation. The manipulation section 110 may include a microphone and a speaker.

The wireless communication section 130 performs wireless communication with another vehicle 100. The wireless communication section 130 performs wireless communication with another vehicle 100 via vehicle-to-vehicle direct communication.

The image capturing section 140 includes one or more cameras. The camera may also be a drive recorder. If the image capturing section 140 includes a plurality of cameras, the plurality of cameras are respectively provided at different positions on the vehicle 100. Also, the plurality of cameras respectively perform image capturing in different image-capturing directions.

The GNSS receiving section 150 receives radio waves transmitted from GNSS satellites. The GNSS receiving section 150 may also specify a location of the self vehicle based on a signal received from the GNSS satellites.

The sensor section 160 includes one or more sensors. For example, the sensor section 160 includes an acceleration sensor. For example, the sensor section 160 includes an angular speed sensor (gyro sensor).

For example, the sensor section 160 includes a geomagnetic sensor. For example, the sensor section 160 includes a vehicle speed sensor.

The control device 200 controls the manipulation section 110, the display section 120, the wireless communication section 130, the image capturing section 140, the GNSS receiving section 150, and the sensor section 160, to perform various processes.

For example, the control device 200 performs a navigation process. The control device 200 may perform a navigation process similar to a navigation process performed by a known car navigation system.

For example, the control device 200 specifies a current location of the vehicle 100 based on outputs from the GNSS receiving section 150 and the sensor section 160, reads out map data corresponding to the current location, and causes the display section 120 to display the map data. Also, the control device 200 accepts an input of a destination via the manipulation section 110, specifies a recommended route from a current location of the self vehicle to the destination, and displays the recommend route to the display section 120. When accepting a selection of the route, the control device 200 performs a guidance of a path on which the self vehicle should travel via the display section 120 and a speaker according to the selected route.

The control device 200 according to the present embodiment performs a request process to request another vehicle 100 to transmit a captured image of an image-capturing target place. For example, the control device 200 accepts the designation of an image-capturing target place by the user via the manipulation section 110. For example, the control device 200 accepts a pointing input onto the map displayed by the display section 120. Also, for example, the control device 200 also accepts an audio input designating the image-capturing target spot. Then, the control device 200 generates the request information including spot location information that indicates designated image-capturing target spot, transmitting source information that indicates the self vehicle and vehicle location information that indicates a location of the self vehicle, and broadcasts the request information to the wireless communication section 130.

Also, the control device 200 according to the present embodiment performs a display process of receiving a captured image transmitted by another vehicle 100 and displaying the received captured image. The control device 200 may cause the display section 120 to display the captured image received by the wireless communication section 130 from another vehicle 100. For example, the control device 200 causes the captured image to be displayed at a position corresponding to the image-capturing target spot on the map displayed by the display section 120.

Figure 7:
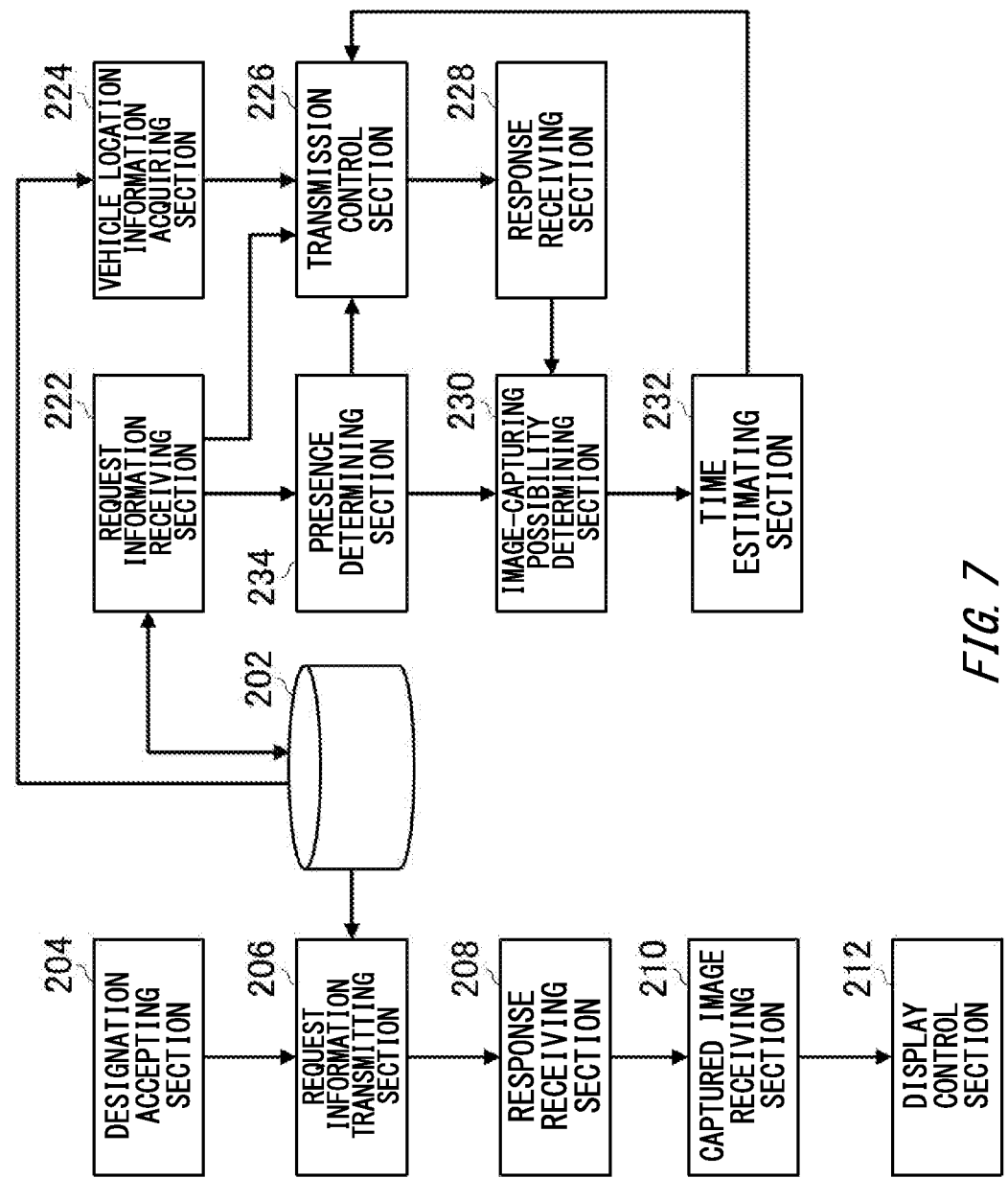
FIG. 7 schematically shows one example of a functional configuration of a control device 200.

FIG. 7 schematically shows one example of a functional configuration of the control device 200. The control device 200 includes a storage section 202, a specification accepting section 204, a request-information transmitting section 206, a response receiving section 208, a captured-image receiving section 210, a display control section 212, a request-information receiving section 222, a vehicle location information acquiring section 224, a transmission control section 226, a response receiving section 228, an image-capturing possibility determining section 230, a time estimating section 232 and a presence determining section 234. Note that the control device 200 does not necessarily include all of these components.

The storage section 202 stores various information. The storage section 202 may store map data. The storage section 202 may store self vehicle identification information by which the self vehicle can be identified during communication. The storage section 202 may store vehicle location information that indicates a current location of the self vehicle. The storage section 202 may store route information that indicates a route to a destination of the self vehicle. The storage section 202 may store a captured image captured by the image capturing section 140.

The specification accepting section 204 accepts designation of an image-capturing target spot. For example, the specification accepting section 204 accepts the designation of the image-capturing target spot by a pointing input via the manipulation section 110. Also, the specification accepting section 204 accepts the designation of the image-capturing target spot by an audio input via the manipulation section 110.

The request-information transmitting section 206 transmits the request information. The request-information transmitting section 206 may cause the wireless communication section 130 to transmit the request information by means of broadcast to another vehicle 100. The request-information transmitting section 206 may transmit the request information including spot location information that indicates the image-capturing target spot that the specification accepting section 204 accepted the designation, self vehicle identification information stored in the storage section 202, and vehicle location information that indicates a location of the self vehicle stored in the storage section 202.

The response receiving section 208 receives a response from another vehicle 100 that received the request information transmitted by the request-information transmitting section 206. For example, the response receiving section 208 receives an agreement response for an agreement of capturing an image of the image-capturing target spot in response to the request information and transmitting the captured image. Also, for example, the response receiving section 208 receives an image-cannot-be-captured response indicating that an image of the image-capturing target spot cannot be captured and an captured image cannot be transmitted.

When the response receiving section 208 receives the agreement response, the captured-image receiving section 210 receives the captured image transmitted by another vehicle 100 that transmitted the agreement response. The captured-image receiving section 210 may receive a captured image via the wireless communication section 130.

The display control section 212 displays the captured image received by the captured-image receiving section 210. For example, the display control section 212 causes the display section 120 to display the captured image. Also, the display control section 212 may also transmit a captured image to a pre-designated communication terminal and cause the communication terminal to display the captured image. As an example of the communication terminal, a mobile phone, such as a smart phone, a tablet terminal and the like that a user of the self vehicle owns can be given.

The request-information receiving section 222 receives the request information transmitted by another vehicle 100. The request-information receiving section 222 may store the received request information in the storage section 202. When pieces of spot location information and pieces of transmitting source information of a plurality of pieces of request information received from a plurality of vehicles 100 are the same, the request-information receiving section 222 may discard other pieces of request information among the plurality of pieces of request information other than one piece of request information. Also, when the self vehicle is not closer to the image-capturing target spot than the vehicle 100 that transmitted the request information is, the request-information receiving section 222 may discard the request information.

The vehicle location information acquiring section 224 acquires vehicle location information that indicates a location of the self vehicle. The vehicle location information acquiring section 224 may receive the vehicle location information from the storage section 202.

Based on the request information received by the request-information receiving section 222 and the vehicle location information acquired by the vehicle location information acquiring section 224, when the self vehicle is located within a predetermined range with the image-capturing target spot as a reference, the transmission control section 226 determines to transmit an captured image of the image-capturing target spot captured by the image capturing section 140 to the transmitting source indicated by the transmitting source information. After the determination is made, the transmission control section 226 may cause the wireless communication section 130 to transmit the agreement response to the transmitting source. Also, after the determination is made, the transmission control section 226 may cause the wireless communication section 130 to transmit the captured image of the image-capturing target spot captured by the image capturing section 140 to the transmitting source.

The transmission control section 226 transmits the request information when the self vehicle is located outside the predetermined range. The transmission control section 226 may cause the wireless communication section 130 to broadcast the request information. The transmission control section 226 may include, in the request information, the self vehicle identification information stored in the storage section 202 as the transmitting source information that indicates the transmitting source of the request information. Also, the transmission control section 226 may include, in the request information, the vehicle location information stored in the storage section 202.

The response receiving section 228 receives a response to the request information transmitted by the transmission control section 226. The response receiving section 228 receives the agreement response or the image-cannot-be-captured response.

If the response receiving section 228 does not receive the agreement response to the request information, the image-capturing possibility determining section 230 determines whether or not an image of the image-capturing target spot can be captured by the image capturing section 140. For example, when the route indicated by the route information stored in the storage section 202 includes the image-capturing target spot, the image-capturing possibility determining section 230 determines that an image of the image-capturing target spot can be captured, and when the route does not include the image-capturing target spot, the image-capturing possibility determining section 230 determines that an image of the image-capturing target spot cannot be captured. When it is determined, by the image-capturing possibility determining section 230, that the image capturing can be performed, the transmission control section 226 transmits the agreement response to the transmitting source of the request information, and after the self vehicle moves into the predetermined range, the transmission control section 226 transmits the captured image of the image-capturing target spot captured by the image capturing section 140 to the transmitting source. When it is determined, by the image-capturing possibility determining section 230, that image capturing cannot be performed, the transmission control section 226 may transmit the image-cannot-be-captured response to the transmitting source of the request information.

When it is determined, by the image-capturing possibility determining section 230, that the image capturing can be performed, the time estimating section 232 estimates time that is until the image capturing section 140 can capture an image of the image-capturing target spot due to the movement of the self vehicle. For example, the time estimating section 232 estimates the time according to the location of the self vehicle and the location of the image-capturing target spot. The time estimating section 232 may also estimate the time further based on a travelling speed of the self vehicle. Also, the time estimating section 232 may also estimate the time further based on route traffic information. The transmission control section 226 may transmit the time estimated by the time estimating section 232 to the transmitting source. Further, the transmission control section 226 may transmit, to the transmitting source, the time estimated by the time estimating section 232 and the location information of the self vehicle (the location information of the first vehicle).

When the request-information receiving section 222 has received the request information, the presence determining section 234 determines whether or not there is another vehicle 100 that is located closer to the image-capturing target spot than the self vehicle is. When the self vehicle is located outside the predetermined range and it is determined, by the presence determining section 234, that there is no another vehicle 100 that is located closer to the image-capturing target spot than the self vehicle is, the transmission control section 226 may determine to transmit the captured image of the image-capturing target spot captured by the image capturing section 140 to the transmitting source, and when it is determined, by the presence determining section 234, that there is another vehicle 100 that is located closer to the image-capturing target spot than the self vehicle is, the transmission control section 226 may transmit the request information.

When the self vehicle is outside the predetermined range and when it is determined, by the presence determining section 234, that there is no another vehicle 100 that is located closer to the image-capturing target spot than the self vehicle is, the image-capturing possibility determining section 230 may determine whether or not the image capturing section 140 can capture an image of the image-capturing target spot. When it is determined, by the image-capturing possibility determining section 230, that the image capturing can be performed, after the self vehicle moves into the predetermined range, the transmission control section 226 may transmit the captured image of the image-capturing target spot captured by the image capturing section 140 to the transmitting source.

Figure 8:
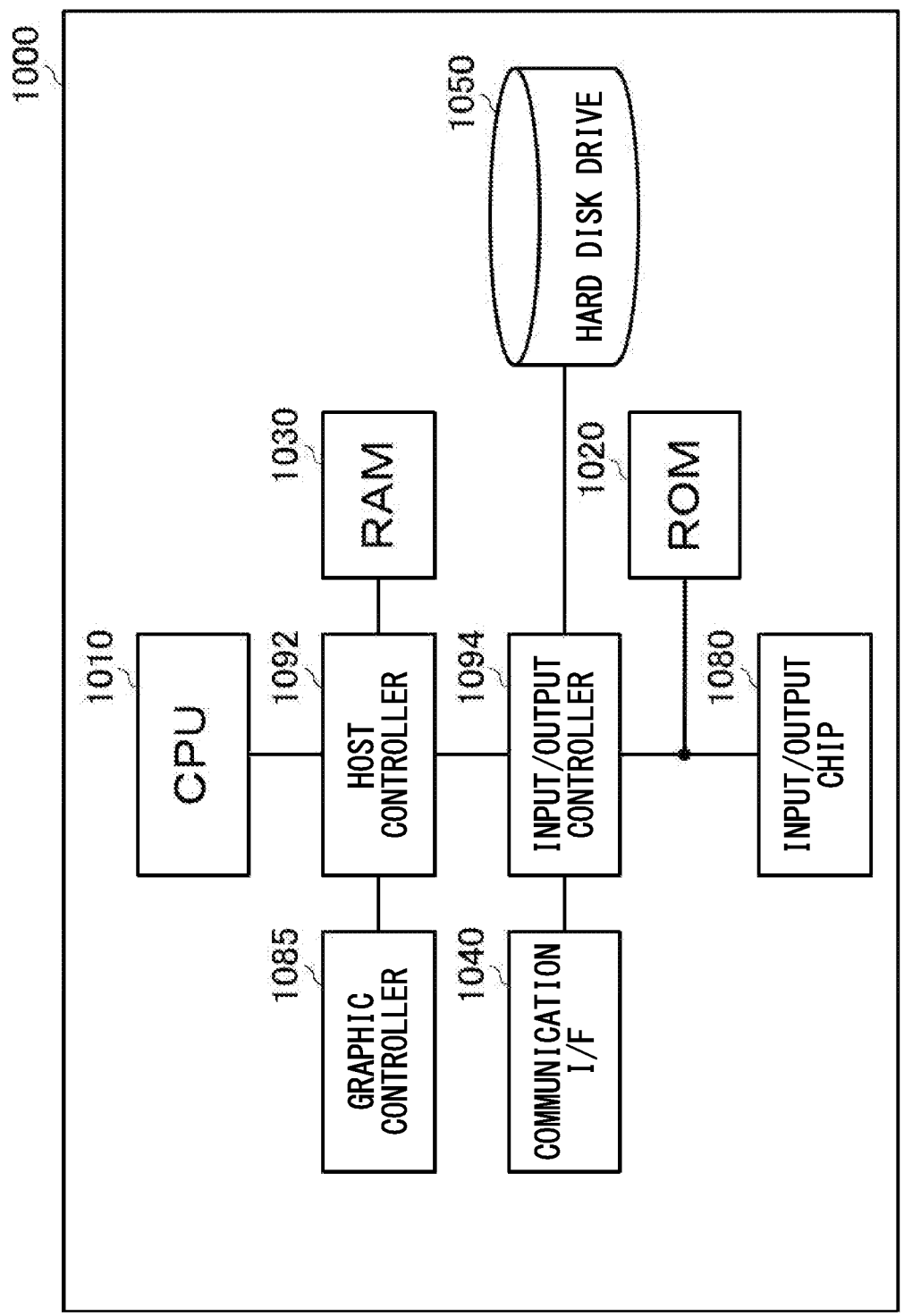
FIG. 8 schematically shows one example of hardware configuration of a computer 1000 that functions as the control device 200.

FIG. 8 schematically shows one example of a computer 1000 that functions as the control device 200. The computer 1000 according to the present embodiment includes a CPU-surrounding section including a CPU 1010, a RAM 1030, and a graphic controller 1085, which are connected to each other by a host controller 1092, and an input/output section including a ROM 1020, a communication I/F 1040, a hard disk drive 1050, and an input/output chip 1080, which are connected to the host controller 1092 by an input/output controller 1094.

The CPU 1010 operates based on programs stored in the ROM 1020 and the RAM 1030 to control each section. The graphic controller 1085 acquires image data generated such as by the CPU 1010 on a frame buffer provided in the RAM 1030, and causes the image data to be displayed on a display. Instead, the graphic controller 1085 may itself include a frame buffer for storing image data generated such as by the CPU 1010.

The communication I/F 1040 communicates with other devices via a wired or wireless network. Also, the communication I/F 1040 functions as hardware for performing communication. The hard disk drive 1050 stores programs and data used by the CPU 1010.

The ROM 1020 stores a boot program executed by the computer 1000 at startup, programs dependent on hardware of the computer 1000, and the like. The input/output chip 1080 connects various input/output devices to the input/output controller 1094 such as via a parallel port, a serial port, a keyboard port, and a mouse port, for example.

Programs provided to the hard disk drive 1050 via the RAM 1030 are provided by a user in a form stored in a recording medium such as an IC card. The programs are read out from the recording medium, installed onto the hard disk drive 1050 via the RAM 1030, and executed on the CPU 1010.

The programs installed onto the computer 1000 for causing the computer 1000 to function as the control device 200 may instruct the CPU 1010 or the like to cause the computer 1000 to function as each section of the control device 200. Information processes described in these programs function, by being reading by the computer 1000, as the storage section 202, the specification accepting section 204, the request-information transmitting section 206, the response receiving section 208, the captured-image receiving section 210, the display control section 212, the request-information receiving section 222, the vehicle location information acquiring section 224, the transmission control section 226, the response receiving section 228, the image-capturing possibility determining section 230, the time estimating section 232 and the presence determining section 234, which are specific means that various hardware resources cooperate with each other. Further, these specific means implement operations or processing of information according to the intended use of the computer 1000 in the present embodiment, and the control device 200 is thereby constructed to be specific for the intended use.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: image-capturing target spot; 12: predetermined range; 100: vehicle; 102: communication area; 110: manipulation section; 120: display section; 130: wireless communication section; 140: image capturing section; 150: GNSS receiving section; 160: sensor section; 171, 172, 173: vehicle; 181, 182, 183, 184, 185, 186, 187 . . . vehicle; 200: control device; 202: storage section; 204: specification accepting section; 206: request-information transmitting section; 208: response receiving section; 210: captured-image receiving section; 212: display control section; 222: request-information receiving section; 224: vehicle location information acquiring section; 226: transmission control section; 228: response receiving section; 230: image-capturing possibility determining section; 232: time estimating section; 234: presence determining section; 1000: computer; 1010: CPU; 1020: ROM; 1030: RAM; 1040: communication I/F; 1050: hard disk drive; 1080: input/output chip; 1085: graphic controller; 1092: host controller; 1094: input/output controller

What is claimed is:

1. A control device having a processor to function as:
   a request-information receiving section configured to receive request information that is for requesting transmission of a captured image of an image-capturing target spot and that includes spot location information indicating the image-capturing target spot, and transmitting source information indicating a transmitting source of the request information;
   a vehicle location information acquiring section configured to acquire vehicle location information that indicates a location of a first vehicle;
   a transmission control section configured to, based on the vehicle location information, (i) when the first vehicle is located within a predetermined range with the image-capturing target spot as a reference, transmit a captured image of the image-capturing target spot captured by an image capturing section included in the first vehicle to the transmitting source indicated by the transmitting source information; and (ii) when the first vehicle is located outside the predetermined range, broadcast the request information to a vehicle other than the first vehicle; and
   a determining section configured to determine whether there is a vehicle located closer to the image-capturing target spot than the first vehicle is, wherein
   when the first vehicle is located outside the predetermined range, if it is determined by the determining section that a vehicle located closer to the image-capturing target spot than the first vehicle is not present, the transmission control section transmits, to the transmitting source, a captured image of the image-capturing target spot captured by the image capturing section, and if it is determined by the determining section that a vehicle located closer to the image-capturing target spot than the first vehicle is present, the transmission control section broadcasts the request information to a vehicle other than the first vehicle.

2. The control device according to claim 1, comprising an image-capturing possibility determining section configured to determine whether an image of the image-capturing target spot can be captured by the image capturing section included in the first vehicle, wherein
   when the image-capturing possibility determining section determines that an image of the image-capturing target spot can be captured, after the first vehicle moves into the predetermined range, the transmission control section transmits, to the transmitting source, an captured image of the image-capturing target spot captured by the image capturing section.

3. The control device according to claim 2, comprising a time estimating section configured to: when the image-capturing possibility determining section determines that an image of the image-capturing target spot can be captured, estimate time that is until the first vehicle moves such that the image capturing section of the first vehicle can capture an image of the image-capturing target spot, wherein the transmission control section transmits the time estimated by the time estimating section to the transmitting source.

4. The control device according to claim 2, comprising a response receiving section configured to receive a response to the request information that is broadcasted by the transmission control section to a vehicle other than the first vehicle, wherein when the response receiving section does not receive an agreement response to the request information, the image-capturing possibility determining section determines whether the image capturing section included in the first vehicle can capture an image of the image-capturing target spot.

5. The control device according to claim 2, wherein the image-capturing possibility determining section determines that an image of the image-capturing target spot can be captured when a route indicated by route information indicating a route to a destination of the first vehicle includes the image-capturing target spot, and determines that an image of the image-capturing target spot cannot be captured when the route does not include the image-capturing target spot.

6. The control device according to claim 1, comprising an image-capturing possibility determining section configured to: when the first vehicle is located outside the predetermined range, if it is determined by the determining section that a vehicle located closer to the image-capturing target spot than the first vehicle is not present, determine whether an image of the image-capturing target spot can be captured by the image capturing section included in the first vehicle, wherein when the image-capturing possibility determining section determines that an image of the image-capturing target spot can be captured, the transmission control section transmits, to the transmitting source, a captured image of the image-capturing target spot captured by the image capturing section after the first vehicle moves into the predetermined range.

7. The control device according to claim 6, comprising a time estimating section configured to: when the image-capturing possibility determining section determines that an image of the image-capturing target spot can be captured, estimate time that is until the first vehicle moves such that the image capturing section of the first vehicle can capture an image of the image-capturing target spot, wherein the transmission control section transmits the time estimates by the time estimating section to the transmitting source.

8. The control device according to claim 1, wherein the request information includes transmitting source location information indicating a location of a transmitting source that has transmitted the request information, and when the first vehicle is located outside the predetermined range and the location indicated by the vehicle location information is closer to the image-capturing target spot than the location indicated by the transmitting source location information is, the transmission control section transmits the request information to a vehicle other than the first vehicle.

9. The control device according to claim 1, wherein when the spot location information and the transmitting source information in a plurality of pieces of request information, including the request information, received from a plurality of vehicles are the same, the request-information receiving section discards other pieces of request information among the plurality of pieces of request information other than one piece of request information.

10. The control device according to claim 1, wherein the request-information receiving section receives the request information via vehicle-to-vehicle communication.

11. The control device according to claim 1, wherein the transmission control section transmits the captured image via vehicle-to-vehicle communication.

12. The control device according to claim 1, wherein the transmission control section broadcasts the request information to a vehicle other than the first vehicle via vehicle-to-vehicle communication.

13. The control device according to claim 1, wherein the control device is mounted on the first vehicle.

14. A non-transitory computer readable storage medium storing a program for causing a computer to function as:

a request-information receiving section configured to receive request information that is for requesting transmission of a captured image of an image-capturing target spot and that includes spot location information indicating the image-capturing target spot and transmitting source information indicating a transmitting source of the request information;

a vehicle location information acquiring section configured to acquire vehicle location information that indicates a location of a first vehicle;

a transmission control section configured to, based on the vehicle location information, (i) when the first vehicle is located within a predetermined range with the image-capturing target spot as a reference, transmit, to the transmitting source indicated by the transmitting source information, a captured image of the image-capturing target spot captured by an image capturing section included in the first vehicle; and (ii) when the first vehicle is located outside the predetermined range, broadcast the request information to a vehicle other than the first vehicle; and a determining section configured to determine whether there is a vehicle located closer to the image-capturing target spot than the first vehicle is, wherein when the first vehicle is located outside the predetermined range, if it is determined by the determining section that a vehicle located closer to the image-capturing target spot than the first vehicle is not present, the transmission control section transmits, to the transmitting source, a captured image of the image-capturing target spot captured by the image capturing section, and if it is determined by the determining section that a vehicle located closer to the image-capturing target spot than the first vehicle is present, the transmission control section broadcasts the request information to a vehicle other than the first vehicle.

* * * * *